United States Patent [19]

Freeland et al.

[11] 4,262,331
[45] Apr. 14, 1981

[54] SELF-ADAPTIVE COMPUTER LOAD CONTROL

[75] Inventors: Joseph W. Freeland, Manassas, Va.; John E. Gaffney, Jr., Bethesda, Md.; Irwin L. Isert, Reston, Va.

[73] Assignee: IBM Corporation, Armonk, N.Y.

[21] Appl. No.: 955,562

[22] Filed: Oct. 30, 1978

[51] Int. Cl.³ .............................................. G06F 15/16
[52] U.S. Cl. ................................................. 364/200
[58] Field of Search ........................ 364/200 MS File

[56] References Cited

U.S. PATENT DOCUMENTS

| | | | |
|---|---|---|---|
| 3,368,203 | 2/1968 | Loizides | 364/900 |
| 3,370,276 | 2/1968 | Schell, Jr. | 364/200 |
| 3,426,331 | 2/1969 | Joyce | 364/200 |
| 3,434,115 | 3/1969 | Chomicki | 364/900 |
| 3,588,837 | 6/1971 | Rash et al. | 364/200 |
| 3,723,975 | 3/1973 | Kurtz, Sr. et al. | 364/200 |
| 4,056,846 | 11/1977 | Callahan et al. | 364/200 |

*Primary Examiner*—Raulfe B. Zache
*Attorney, Agent, or Firm*—John E. Hoel

[57] ABSTRACT

A self-adaptive computer load control apparatus and method are disclosed for allocating servicing time by a Central Processing Unit (CPU) to several Peripheral Processing Units (PE) under processing overload conditions. Each PE contains registers for storing the value of an expected interval of time between consecutive service periods, for storing the time of commencement of the last service period, and for storing the time of commencement of the present service period. Each PE also includes a comparator for comparing the difference between the times of commencement of the last and present service periods with the value of the expected interval between consecutive service periods. A control word generator is included in each PE for specifying the number of processing steps to be performed by the CPU during the present service period for the respective PE's. The number of processing steps specified has a first magnitude when the comparator determines that the difference between the commencement times is less than the expected time. The number of processing steps specified is made less by the control word generator when the difference in commencement times is greater than the expected time between consecutive service periods.

2 Claims, 4 Drawing Figures

SELF-ADAPTIVE COMPUTER LOAD CONTROL

FIELD OF THE INVENTION

The invention disclosed broadly relates to digital computers and more particularly relates to computer load control techniques.

BACKGROUND OF THE INVENTION

Distributed processing systems are available in the prior art which constitute a Central Processing Unit (CPU) connected to a plurality of distributed or Peripheral Processing Units (PE), each of which is respectively connected to a CPU by a data communication path such as a unique data connection for each respective PE to the CPU or alternately a common bus connecting the CPU to all of the PE's along the bus. In such distributed processing configurations, the PE's execute simple repetitive computations and accumulate the results of those computations for periodic transmission to the CPU where more complex computations can be made. Since each of the distributed PE's is competing for servicing time by the CPU, the prior art has employed a variety of techniques for allocating the services of the CPU to each of the respective PE's. For example, simple sequential polling of each of the PE's has been employed in the prior art, allocating equal quantities of CPU servicing time to each of the PE's to accomplish the more complex computations.

However, for those PE's which require relatively less servicing than do other PE's, this simple sequential polling technique is wasteful of the CPU resource. Alternate prior art techniques assigned relative priorities to selected ones of the PE's so that some PE's can command more time from the CPU than can other PE's. A disadvantage of this prior art technique is that under excessive loading of the CPU, the higher priority PE's can monopolize the time on the CPU so that the lower priority PE's are inadequately served.

A similar situation arises in the prior art techniques for multiprogramming where a plurality of application programs are serviced by a single CPU.

OBJECTS OF THE INVENTION

It is therefore an object of the invention to provide an improved distributed processing load control technique.

It is still another object of the invention to provide an improved distributed processing load control apparatus which permits relatively low priority Peripheral Processing Units (PE) to receive some servicing during high overload conditions of the Central Processing Unit (CPU).

It is yet another object of the invention to provide an improved multiprogramming load control method for processing a plurality of application programs so as to reduce the load on a CPU during peak operating periods while enabling it to provide some service to even low priority application programs.

SUMMARY OF THE INVENTION

These and other objects, features and advantages of the invention are accomplished by the self-adaptive computer load control method and apparatus disclosed herein. A self-adaptive computer load control apparatus and method are disclosed for allocating servicing time by a Central Processing Unit (CPU) to several Peripheral Processing Units (PE) under processing overload conditions. Each PE contains registers for storing the value of an expected interval of time between consecutive service periods, for storing the time of commencement of the last service period and for storing the time of commencement of the present service period. Each PE also includes a comparator for comparing the difference between the times of commencement of the last and present service periods with the value of the expected interval between consecutive service periods. A control word generator is included in each PE for specifying the number of processing steps to be performed by the CPU during the present service period for the respective PE's. The number of processing steps specified has a first magnitude when the comparator determines that the difference between the commencement times is less than the expected time. The number of processing steps specified is made less by the control word generator when the difference in commencement times is greater than the expected time between consecutive service periods. Where the PE's each have an associated relative priority for servicing by the CPU, the control word generator includes a multiplier for multiplying the value of the number of processing steps by a numerical value for the relative priority of the respective PE. In this manner, relatively low priority PE's will receive some servicing by the CPU under overload conditions. In an alternate embodiment, the method of the invention can be applied as a multiprogramming load control technique for processing a plurality of application programs so as to reduce the load on a CPU during peak operating periods while enabling it to provide some service even to the lowest priority application programs being executed.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
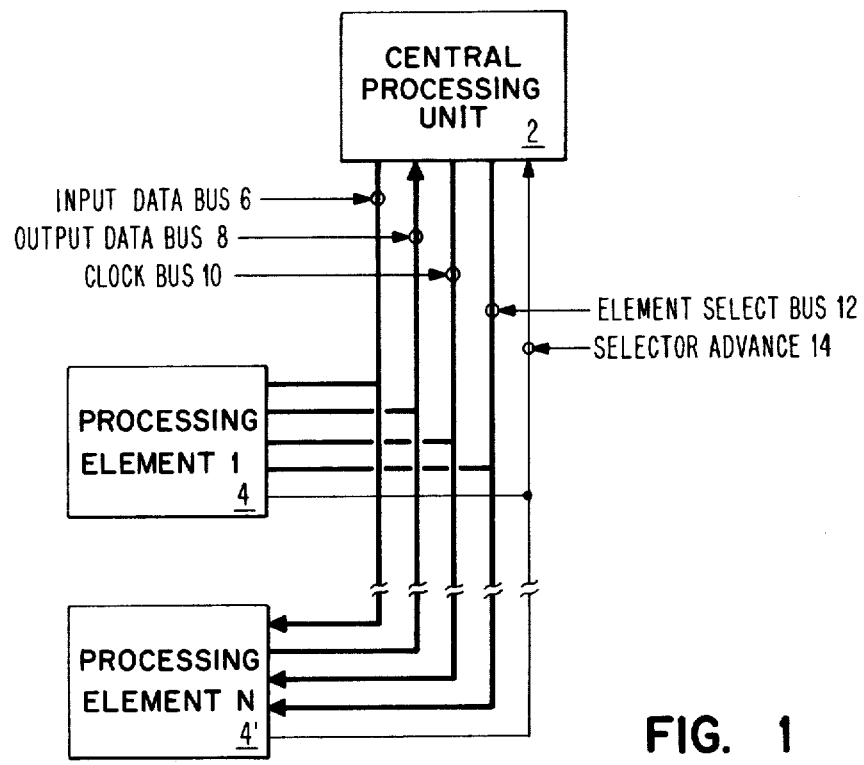
FIG. 1 is a system block diagram of a distributed processing system within which the invention finds application.

A distributed processing system is shown in FIG. 1 which includes a Central Processing Unit (CPU) 2 having a relatively superior computing capability and a plurality of Peripheral Processing Units (PE) 4 and 4', for example, each having a relatively lesser computing capability with respect to that of the CPU 2 and each respectively connected to the CPU by means of a communication path constituting the input data bus 6, the output data bus 8, the clock bus 10, the element select bus 12 and the selector advance 14. Although the PE's 4 are able to independently carry out relatively rudimentary computational tasks, they frequently require the use of the superior computing capability of the CPU 2. They, therefore, sequentially share the processing resources of the CPU 2, during sequentially polled service periods which may be controlled by the CPU 2. During each service period, the CPU 2 can perform relatively more complex processing steps for the selected PE 4, which might not otherwise be adequately performed by the PE.

Figure 2:
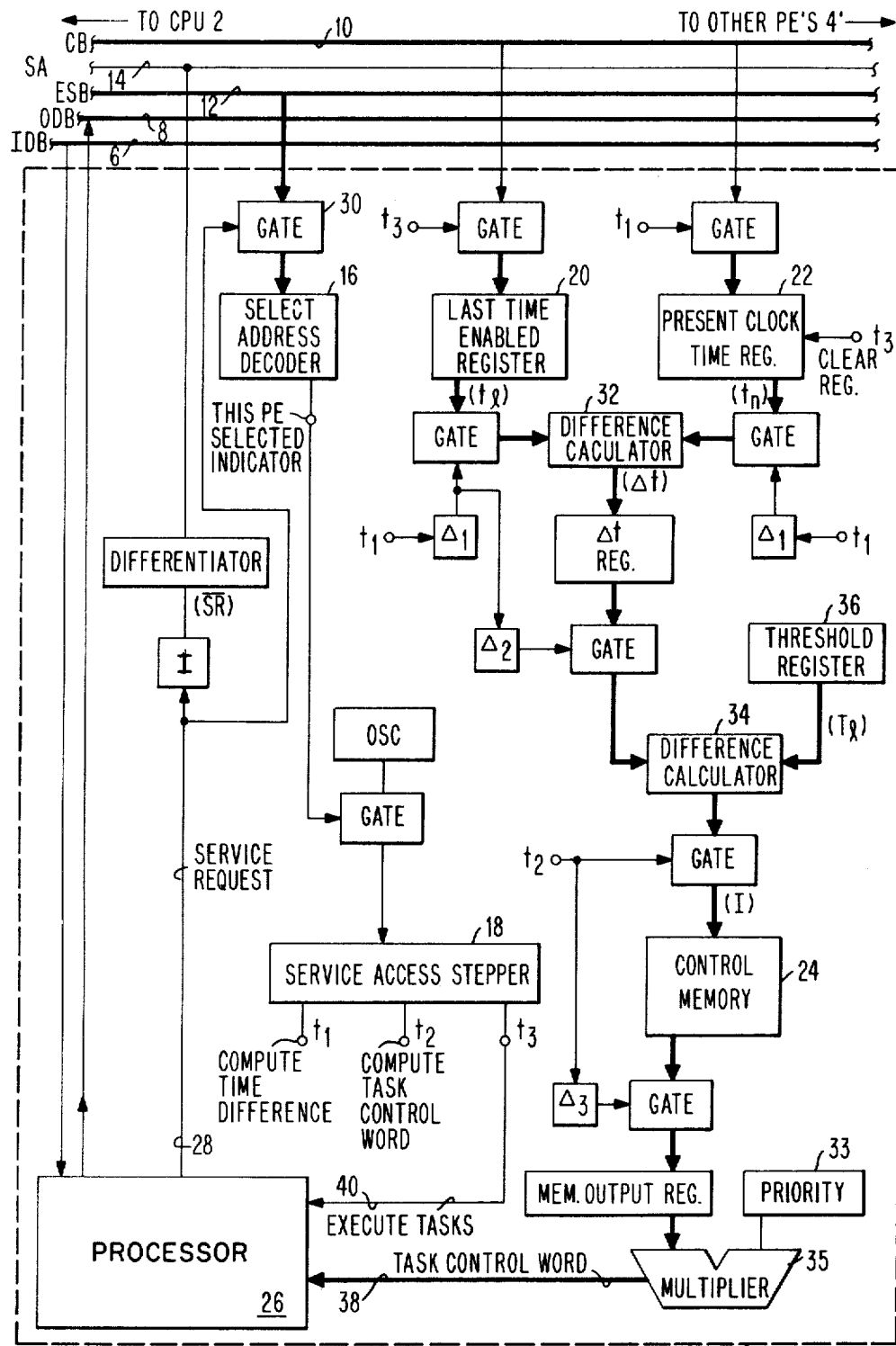
FIG. 2 is a more detailed functional block diagram of the self-adaptive computer load control apparatus contained within a peripheral processing unit.

FIG. 2 shows a more detailed functional block diagram of the self-adaptive computer load control apparatus contained in each PE 4. Each PE 4 contains a storage means 36 for storing the value of an expected interval of time between consecutive service periods for the respective PE 4. Each PE also contains a storage means 20 for storing the time of commencement of the last service period for the respective PE. Each PE further includes a storage means 22 for storing the time of commencement of the present service period for the respective PE.

Each of the storage elements 36, 20 and 22 is connected to a comparator means 34 for comparing the difference between the time of commencement of the present service period and the time of commencement of the last service period with the value of an expected interval of time between the consecutive service periods. Each PE also includes a control word generator 24 which is connected to the comparator 34, for specifying the number of processing steps to be performed by the CPU 2 during the present service period for the respective PE. The number of processing steps specified by the control word generator has a first magnitude when the comparator 34 determines that the difference in the commencement times is less than the expected time and the number of processing steps specified by the control word generator will be less than this first magnitude when the comparator 34 determines that the difference in the commencement times is greater than the expected time for the respective PE. Thus, during process overload conditions for the CPU, the several PE's can regulate the amount of servicing they request of the CPU so as to distribute the effect of the overloaded conditions over the several PE's. If the PE's 4 each have an associated relative priority for servicing by the CPU 2, then a multiplier 35 may be included in the self-adaptive computer load control apparatus of FIG. 2, for multiplying the value of the number of processing steps by a numerical value for the relative priority of the respective PE. In this manner, relatively low priority PE's will receive some servicing by the CPU during overload conditions.

The following constitutes a more detailed discussion of the various elements shown for the self-adaptive computer load control apparatus in FIG. 2. As shown in FIG. 1, each PE 4 is connected to 5 ports on the CPU 2, namely the Input Data Bus 6 (IDB), the Output Data Bus 8 (ODB), the Clock Bus 10 (CB), the Element Select Bus 12 (ESB), and the Selector Advance 14 (SA). The IDB 6 provides for the transfer of information from the CPU 2 to the PE's 4, one unit at a time to that one PE 4 presently selected via the ESB 12. The ODB 8 performs the inverse function of the IDB 6. The CB 10 provides for the clocking of the service access control mechanism in the PE 4 presently selected by the CPU 2. The SA 14 is used by the presently selected PE 4 to indicate to the CPU that its demand for service by the CPU 2 is complete, and hence, that the CPU 2 may select another PE 4' and offer to accord it service. The IDB 6 and the ODB 8 may be recognized as providing a path for information to a PE 4 for it to process and a path from it for information which it has processed.

FIG. 2 shows the PE 4 consisting of the following principal parts: select address decoder 16, service access stepper 18, time registers 20 and 22, control memory 24, and processor 26. The processor 26 is the portion of the PE 4 that performs the PE's function. The other parts constitute the service access control mechanism for the PE 4.

The operation of the PE 4 is as follows. When the processor 26 wants service, it enables the service request line 28 to the input gate 30 from the ESB 12 connected to the select address decoder 16. Thus, the select address decoder 16 will recognize the address of this PE 4 when it appears on the ESB 12. At that point, the service access stepper 18 will advance the service access mechanism through the sequence of steps required to perform the determination of how many elemental tasks the PE 4 will require the CPU 2 to execute or perform at this enablement time. The principal steps in the operation are: receive select address (just described), compute time difference, compute task control word, and execute tasks. The compute time difference step is performed by the time registers 20 and 22. Register 20 holds the last time enabled ($t_l$) value, and the register 22 holds the present clock time ($t_n$). This latter register 22 is loaded from the CB 10 at the first step of the access control process. The difference between the values in registers 20 and 22 is computed in Arithmetic Logic Unit (ALU) 32 and then compared in comparator 34 with the fixed time threshold stored in the threshold register 36 ($T_l$), and the result is an address (index t) of the control memory 24. The control memory 24 contains the maximum number of elemental tasks or a value corresponding to it, which may be performed by the CPU 2 at the request of and exclusively for the processor 26 of the presently selected PE 4 at the present enablement time. This value is the task control word output on line 38.

The index to the control memory 24 is calculated as follows:

Compute:

$t_n - t_l = \Delta t$ (always $>0$)

$$\Delta t - T_l = I \; (>, \text{or}, <, \text{or} = 0) \tag{1}$$

If $I < 0$, the corresponding task control word corresponds to the least time consumptive processing of the CPU 2. For other values of I ($>0$), the task control word will correspond to increasingly time consumptive processing. Note that the values of the task control words are prestored and correspond to the relative priority of a particular PE 4 serviced by the CPU 2. Thus, a higher priority PE 4' would have a task control word indicating that more work may be done for this PE 4 by the CPU 2 for a given value of I, than would be done for a lower priority PE.

After the task control word has been calculated and passed to the processor 26 of the PE 4, the service access stepper 18 is advanced to execute tasks position 40. At this time, the present clock time register 22 is cleared and the last time enabled register 20 is loaded with the value of time from the CB 10. Also, the processor 26 begins to transmit data over ODB 8 to the CPU 2 to execute its tasks for this enablement time. The first operation the processor 26 performs is to translate the value of the task control word to the maximum number of elemental tasks $N_m$ it will have the CPU 2 execute at this enablement time. Then the processor 26 compares that value with the number $N_E$ it wishes to execute. If $N_m < N_E$, the processor 26 has the CPU 2 execute $N_m$ tasks. If $N_m > N_E$, the CPU executes $N_E$ tasks. At the conclusion of servicing by the CPU 2, the processor 26 disables the service request line 28 which causes the service access stepper 18 to be reset, and which also causes the SA line 14 to be activated. The CPU 2 will recognize this as an indication that the CPU 2 has completed all servicing of the PE 4 at this enablement time.

In an alternate embodiment of the invention, the self-adaptive computer load control concept can be applied to a multiprogramming load control for processing a plurality of application programs so as to reduce the load on a CPU during peak operating periods, while enabling it to provide service to the application programs it is executing. A key element in this alternate embodiment of the invention is that the individual application programs are able to sense the level of the load on the CPU, and when that load appears to be greater than the maximum desired level the application programs are then able to reduce their demand for service by the CPU. This distributed load control for each application program has the aggregate effect of adaptively controlling the overall processing load on the CPU resource.

Figure 3:
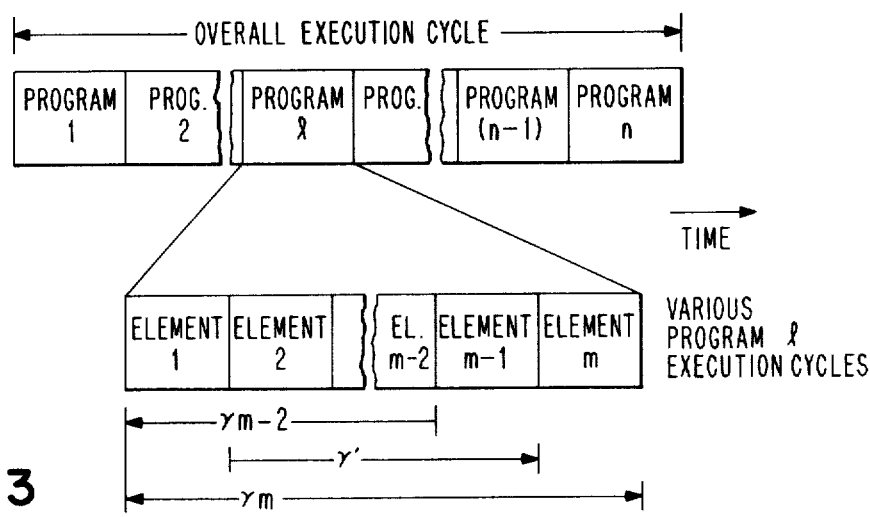
FIG. 3 illustrates the sequential execution of a plurality of application programs in a multi-programming environment.

The multiprogramming process is diagramatically represented in FIG. 3 where a plurality of 'n' application programs are to be executed in a CPU by sequentially polling each application program, and performing either a preselected number of elemental steps in the application program, or performing as many elemental steps as can be executed within a preselected period of enablement. After the preselected number of steps have been executed, or the preselected time has expired, the next application program in the sequence is polled by the CPU. This process continues until all application programs have been polled and then the polling cycle repeats by polling the first application program again and continuing the execution of elemental steps therein, starting where execution was terminated during the last polling cycle. The duration between the commmencement of execution of elemental steps in a particular application program, for consecutive polling sequences, is called the polling cycle, and the instant when the execution of elemental steps in a particular application program commences is called the enablement time. The duration during which execution of elemental steps takes place for a particular application program which has been polled is called the enablement period.

This alternate embodiment of the invention is a means for a particular application program, in a multiprogrammed system, to infer the existence of a peak or overload condition in its CPU host, and thence to temporarily reduce its demand on the CPU. This action reduces the overall level of demand on the CPU, while enabling the CPU to provide service to all of the application programs it hosts, although perhaps at a reduced level. The individual application program infers an impending actual peak load condition for the system as a whole by noting the difference between the scheduled and the actual enablement times in one polling cycle. Then, the application program reduces its demand on the CPU when this time difference exceeds some time threshold. This approach applies to an application program of a multiprogram software configuration which is structured as a sequence of different types of tasks that are applied to one set of data or one type of task that is applied to several sets of data, or to some combination of these two configurations. This approach to CPU load control does not require the executive program to change its logic or its schedule of application program enablements. Rather, as described above, individual application programs sense that the level of the load on the CPU is greater than a desired level and then reduce their demand for load allocation by the CPU.

In the alternate embodiment of the invention, the load on a CPU, which is processing several application programs in a multiprogram environment, can be reduced in a peak load situation by the independent action taken by one or more of the application programs to temporarily reduce its demand for CPU allocation. Each individual application program uses as an indicator of the CPU load, the duration of time in excess of the scheduled polling cycle duration that it had to wait to be given CPU allocation under the control of the executive program. This is done without the knowledge of the executive program in the CPU and thus does not require the executive to be reconfigured.

A significant aspect of this embodiment of the invention is that it is a more efficient means for schedule variation than is a modification to an executive program for this purpose. This is because the executive interrupt overhead that exists for this purpose in a conventional system does not contribute to overall CPU load in the design of the instant invention.

The alternate embodiment may be described with reference to FIG. 3, which illustrates the sequence of operational steps in the system. There are to be 'n' application programs in the overall polling cycle. Each one of the application programs, for example, '$l^{th}$' is comprised by up to 'm' elemental steps. During a nonoverload situation, all of the elemental steps, up to and including the '$m^{th}$', beginning with the successor to the last element executed on the previous overall polling cycle, would be executed. Thus, if the last element executed in a particular application program were number 's', then elements numbered (s+1), modulo 'm' through number 'm' would be executed during the new enablement period of the application program. During an overload situation, however, less than the full complement of elements for the particular application program would be scheduled for execution under the invention disclosed here. The number scheduled can be fixed or can be a function of the degree of lateness of the enablement time of the application program relative to the expected instant for its enablement. Thus, the advantage of the system disclosed herein over prior art systems is that each of the 'n' application programs would be able to process at least some of its elemental steps during the course of one overall polling cycle. Whereas, without this system, some of the application programs might be completely executed while others might not have any of their elememts executed during one or more overall polling cycles.

FIG. 3 illustrates that with the invention disclosed herein, various possible subsets of elements of any given application program number 'l' may be executed during one overall polling cycle. In one case, just (m−2) elements would be executed. In another case, elements numbered 2 through (m−1) might be executed, element numbered 'l' having been executed on the previous overall polling cycle.

Each element can be a unique subroutine, where each of the elements, for example, 'm' in an application program, for example, the '$l^{th}$' is applied in sequence to the same data set. Alternatively, an element can be a logical representation of the same subroutine being applied to 'm' different sets of data. An example of this would be if an application program 'l' were an implementation of a digital filter to be applied to 'm' different channels of data.

Figure 4:
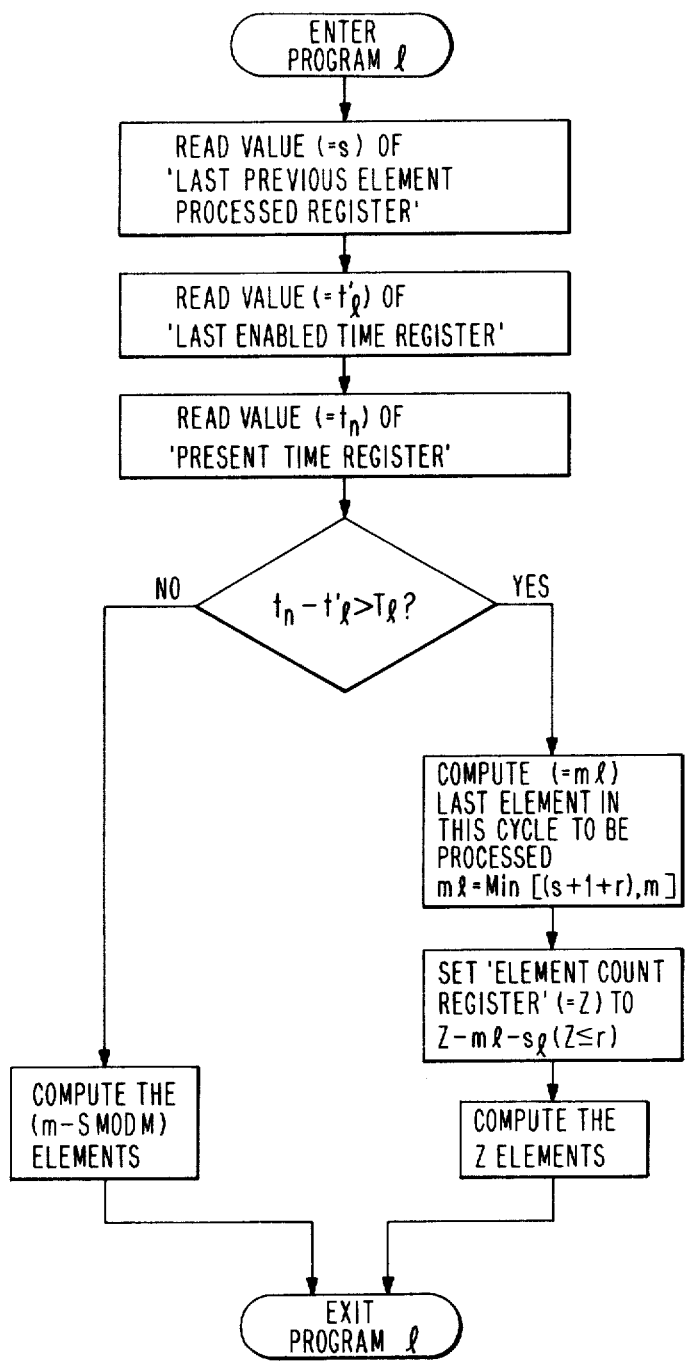
FIG. 4 is a flow diagram of an alternate embodiment of the invention for multiprogramming load control of a plurality of application programs.

FIG. 4 illustrates the operational flow of any one of the application programs, for example, 'l$^{th}$' in a multiprogramming environment operating under the self-adaptive load control mechanism of this alternate embodiment of the invention. Associated with each of the 'n' application programs, for example, 'l$^{th}$' are three registers, a Last Previous Element Processed Register (LPEP), a Last Enabled Time Register (LET), and an Element Count Register (EC). Also, the CPU has available to each application program a Present Time Register (PT). The LPEP register contains the identity of the element of the application program number 'l' which was the last element processed on the application program's previous enablement. Thus, in the case of application program numbered 'l', if this element were 'm', that would indicate that during the present enablement period, element numbered 'l' will be the first to be processed. The LET register contains the instant of time when application program number 'l' was last enabled. The EC register contains the number of elements that are scheduled to be processed during the present enablement period.

As shown in FIG. 4, if $(t_n - t_l) > T_l$, which is the threshold for application program numbered 'l', then 'r' which is ($<$m) elements are to be processed during this enablement period. The actual number of elements to be scheduled, as shown in FIG. 4, may be less than the value 'r', depending upon the identity of the last element processed in the last enablement period. The operating principle is that if executing 'r' elements would take the processing sequence beyond element 'm' (the last one for the application program numbered 'l'), then some number $n < r$ elements which were to be processed for the program numbered 'l' during this enablement period will be scheduled such that the last element processed will be numbered 'm'. Alternately, the full complement of 'r' elements could be executed even if doing so would cause several of the first elements to be processed in the next group for that application program.

A significant aspect of this alternate embodiment of the invention is that the self-adaptive mechanism for CPU load allocation can be applied in differing degrees to the various application programs in the multiprogramming set in accordance with their differing priorities for execution. This is accomplished by adjusting the values for 'r' and 'T' for each application program. Basically, high priority application programs can have higher values of 'T$_l$' and 'r' than lower priority application programs. Thus, they would not reduce their demand for CPU allocation at lower degrees of CPU overload and would not reduce the number of their elements to be scheduled for processing by the CPU to the degree that lower priority programs would.

A variation may be employed to the sequence illustrated in FIG. 4 in which the selection of the number of elements of the application program numbered 'l' to be executed during a given processing cycle can be a function of the load condition of the CPU over several overall polling cycles, rather than just one, as shown in the FIG. 4. One variation would be to compute $(t_n - t_l)$ and average it with the value of $(t_n - t_l)$ calculated and saved from the previous execution cycle or several cycles and then establish a threshold for this average. Another more complex variation is to average the $(t_n - t_l)$ as just described and weight that value with the number of elements of application program numbered 'l' that were processed during the previous enablement period. In either of these cases, the number 'r' of elements to be scheduled to be processed during this present enablement period for the application program numbered 'l' could be a function of the value of $(t_n - t_l)$ or the weighted sum of such factors, as described above.

The distributed adaptive computer load control method and apparatus disclosed herein enables the reduction in the overall level of processing demand on a CPU whether it is in a distributed processing system or in a multiprogramming application. In this manner, relatively low priority PE or application programs can avoid being frozen out in peak load situations where higher priority programs of PE's would otherwise monopolize the attention of the CPU.

While the invention has been particularly shown and described with reference to the preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. In a digital processing system including a central processing unit and a plurality of peripheral processing units, each respectively connected to said central processing unit by means of a communication path, the peripheral processing units sequentially sharing the resources of the central processing unit during sequentially polled, service periods for performing steps, wherein the improvement comprises:

means in each peripheral processing unit for storing the value of an expected interval of time between consecutive service periods for the respective peripheral processing unit;

means in each peripheral processing unit for storing the time of commencement of the last service period for the respective peripheral processing unit;

means in each peripheral processing unit for storing the time of commmencement of the present service period for the respective peripheral processing unit;

means in each peripheral processing unit connected to each of the above said means in the respective peripheral processing unit for comparing the difference between said time of commencement of the present service period and said time of commencement of the last service period with said value of an expected interval of time between consecutive service periods;

means in each peripheral processing unit connected to said comparing means and having an output connected to said central processing unit for generating a control word specifying the number of said processing steps to be performed by said central processing unit during the present service period for the respective peripheral processing unit;

said control word generating means regulating processing overload conditions for said central processing unit by outputting a control word specifying a first magnitude for said number of processing steps when said comparing means determines said difference in said commencement times to be less than said expected time and specifying a second magnitude for said number of processing steps, less than said first magnitude, when said comparing means determines said difference in said commencement times to be greater than said expected time for the respective peripheral processing unit;

whereby processing overload conditions for said central processing unit can be regulated by said plurality of peripheral processing units.

2. The apparatus of claim 1, which further comprises: said peripheral processing units each having an associated relative priority for servicing by said central processing unit;

said means for generating a control word further including means for multiplying the value of said number of processing steps by a numerical value for said relative priority for the respective peripheral processing unit;

whereby relatively low priority ones of said plurality of peripheral processing units will receive servicing by said central processing unit under overload conditions.

* * * * *